(12) United States Patent
McCourt

(10) Patent No.: US 8,447,176 B2
(45) Date of Patent: May 21, 2013

(54) DUAL CHIMNEY FLAT PANEL CONVECTION AIR SPACE HEATER

(76) Inventor: Mark J. McCourt, Tomball, TX (US)

( * ) Notice: Subject to any disclaimer, the term of this patent is extended or adjusted under 35 U.S.C. 154(b) by 876 days.

(21) Appl. No.: 12/575,759

(22) Filed: Oct. 8, 2009

(65) Prior Publication Data
US 2011/0085783 A1 Apr. 14, 2011

(51) Int. Cl.
F24D 13/00 (2006.01)
(52) U.S. Cl.
USPC ............ 392/347; 392/360; 392/367; 392/368
(58) Field of Classification Search
None
See application file for complete search history.

(56) References Cited

U.S. PATENT DOCUMENTS

| | | | |
|---|---|---|---|
| 1,651,890 A * | 12/1927 | Hicks | 126/86 |
| 1,652,438 A * | 12/1927 | Hicks | 126/92 R |
| 2,939,807 A * | 6/1960 | Needham | 216/16 |
| 3,108,170 A * | 10/1963 | Murphy | 392/459 |
| 3,829,656 A * | 8/1974 | Temrin | 392/370 |
| 3,961,157 A | 6/1976 | Miller et al. | |
| 4,350,871 A * | 9/1982 | Davis et al. | 392/375 |
| 4,682,009 A * | 7/1987 | Meiser et al. | 392/375 |
| 5,197,111 A * | 3/1993 | Mills et al. | 392/347 |
| 5,568,586 A * | 10/1996 | Junkel | 392/376 |
| 6,130,991 A * | 10/2000 | Chapman | 392/367 |
| 6,490,410 B2 * | 12/2002 | Baribeault et al. | 392/371 |
| 7,195,010 B2 * | 3/2007 | Kuroda et al. | 126/116 A |
| 8,212,187 B2 * | 7/2012 | Lasko | 219/386 |
| 2008/0240689 A1 * | 10/2008 | Coke | 392/367 |
| 2009/0120925 A1 * | 5/2009 | Lasko | 219/386 |

FOREIGN PATENT DOCUMENTS

| | | | |
|---|---|---|---|
| DE | 19614330 C1 * | 3/1997 | |
| DE | 19700659 A1 * | 7/1998 | |
| EP | 1249671 A2 * | 10/2002 | |
| GB | 2088039 A * | 6/1982 | |
| GB | 2240618 A * | 8/1991 | |
| JP | 58195736 A | 11/1983 | |
| JP | 05052415 A * | 3/1993 | |
| KR | 1020000023745 A | 4/2000 | |

OTHER PUBLICATIONS

PCT/US2010/050727, International Search Report (Jun. 9, 2011).
PCT/US2010/050727, Written Opinion (Jun. 9, 2011).

* cited by examiner

*Primary Examiner* — Thor Campbell
(74) *Attorney, Agent, or Firm* — Baker Donelson Bearman Caldwell & Berkowitz, PC

(57) ABSTRACT

A space heater and a method for generating a convection flow of air through chimneys of the space heater for heating an area adjoining the space heater is provided. The space heater includes a first panel, a second panel, and an element having one or more heatable surfaces. The second panel is coupled to the first panel and the element is located therebetween to define the chimneys between the first panel and the second panel. The element has the one or more heatable surfaces located within the chimneys. When activated, the one or more heatable surfaces create thermal energy for generating heated air within the chimneys, the heated air flowing by convection substantially upwardly through the chimneys to provide the heated air to the area adjoining the space heater.

18 Claims, 5 Drawing Sheets

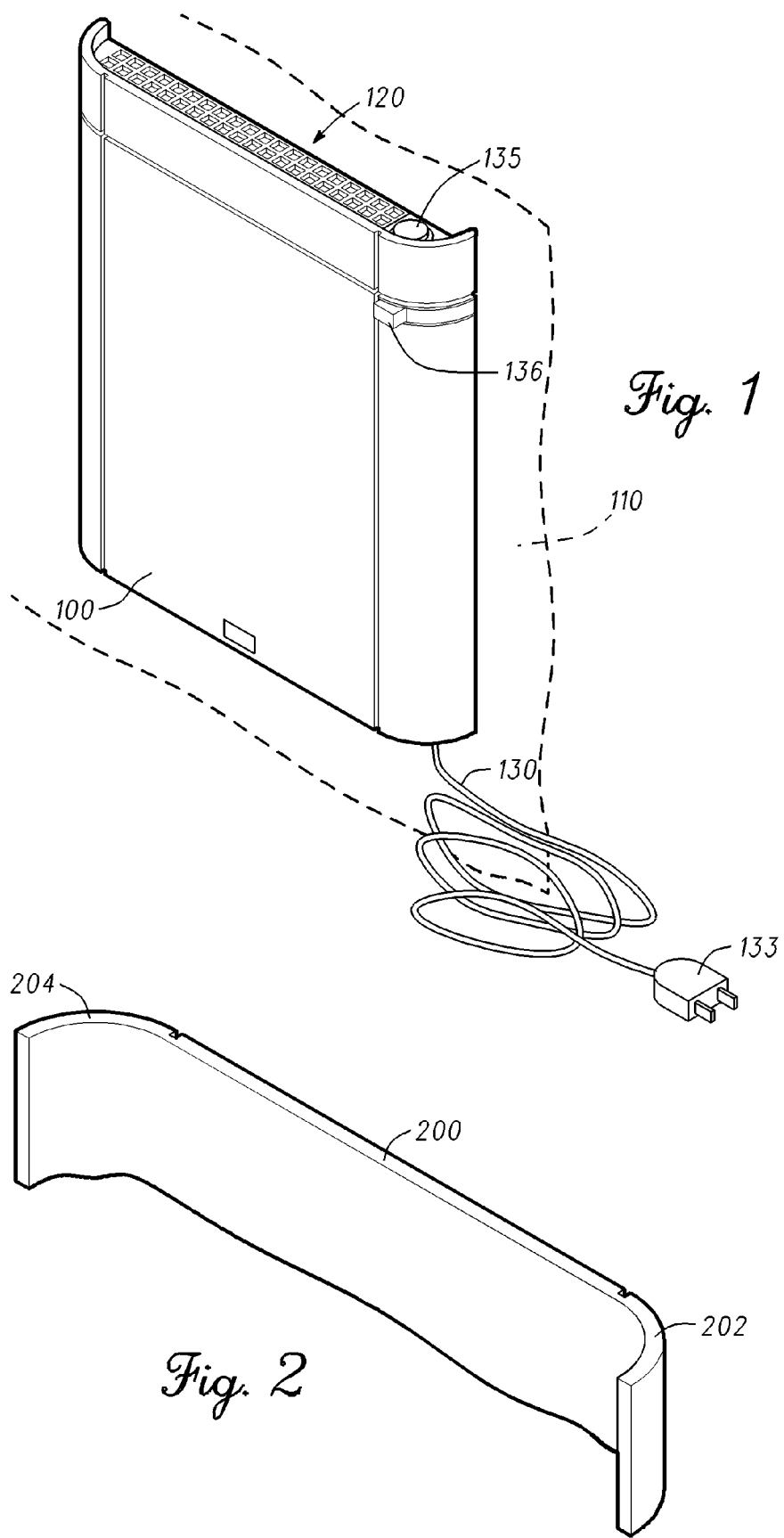

DUAL CHIMNEY FLAT PANEL CONVECTION AIR SPACE HEATER

FIELD OF THE INVENTION

The present invention generally relates to space heaters, and more particularly relates to convection air space heaters.

BACKGROUND OF THE DISCLOSURE

Space heaters are utilized to generate and provide heated air to an area adjoining the space heater such as a room or a portion of a room. The heated air is typically generated by providing electrical energy to a heating element capable of converting the electrical energy into thermal energy. Conventional space heaters provide the heated air to the adjoining area by generating an air flow through the use of an air movement device such as a fan. The heated air is typically provided in a specific direction and within a limited distance of the space heater, unevenly heating the area adjoining the space heater and usually requiring overheating an area closer to the space heater in order to provide heated air to areas further from the space heater. Continued overheating may be detrimental to fragile objects such as plants or candles. In addition, fans may fail thereby causing the space heater to quickly reach a dangerous temperature level.

Further, conventional heating elements have a limited life expectancy and generate thermal radiation in addition to generating the heated air. Typical space heaters have the heating elements visibly exposed to the outside environment. Such irradiative space heaters provide the heat along with thermal radiation only in a direct line of sight with the heating element. Therefore, these irradiative space heaters must necessarily be plainly visible and placed in open areas. In addition, these irradiative space heaters distribute heat unevenly within the area adjoining the space heater, providing essentially no warmth to portions of the area outside the field of view of the space heater (e.g., around a corner, behind a piece of furniture, or off to either side of the space heater). In addition, such space heaters have undesirable, annoying and even unsafe effects because objects and/or people within the field of view of the space heater generally receive heat and thermal radiation in intensities that are often uncomfortable and/or unsafe. Plastics or wax can be warped or melted entirely, painted surfaces can be damaged, flammable fabrics, upholstery or draperies can catch fire, and persons, plants or animals can receive irritation such as mild skin burns from the exposure to intense heat inherent typically provided from these irradiative space heaters.

Most space heaters are automatically controlled by control systems including a timer or thermostat to activate and deactivate the heating element and the fan. The uneven heating described above prevents a thermostat from providing appropriate activation/deactivation of the heating element, thereby preventing maintenance of suitable temperature in the room or area adjoining the space heater. A timer will prevent damage to the heating element, but, even if adjusted for desirable room heating, cannot provide sufficient control to prevent the undesired effects of overheating near the space heater and thermal radiation. In addition, most conventional space heater control systems typically include a relay or relays for activating and deactivating the heating element, the fan or other elements of the space heater. Conventional relays generate an audible and distinct clicking noise when activating or deactivating the heating element. Such noise may be unsuitable for rooms such as bedrooms or hospital rooms.

Thus, what is needed is a space heater for generating heated air and providing the heated air to an area adjoining the space heater in a more even manner, while reducing the undesired noise and thermal radiation provided to such area. Furthermore, other desirable features and characteristics will become apparent from the subsequent detailed description and the appended claims, taken in conjunction with the accompanying drawings and this background of the disclosure.

SUMMARY OF THE INVENTION

According to the Detailed Description, a method is provided for generating a convection flow of air through an enclosed area defined by a first panel and a second panel of a space heater. The method includes the step of heating air by activating a heatable surface within two or more chimneys defined within the enclosed area to generate a pure convection flow of air substantially upward from a lower opening to the enclosed area, through the chimneys and out through an upper opening to the enclosed area to provide heated air from the upper opening to an area adjoining the space heater.

In addition, a space heater is provided for generating heated air and providing the heated air to an area adjoining the space heater. The space heater includes a first panel, a second panel, and an element having one or more heatable surfaces. The second panel is coupled to the first panel and defines an enclosed area between the first panel and the second panel. The element with the heatable surfaces is located within the enclosed area. When activated, the heatable surfaces create thermal energy for generating the heated air within one or more chimneys within the enclosed area, the heated air flowing by convection substantially upward through the chimneys to provide the heated air to the area adjoining the space heater.

Further, a dual chimney space heater is also provided for generating heated air and providing the heated air to an area adjoining the space heater that is to be heated. The dual chimney space heater includes a first panel, a second panel, a third panel, and a controller. The second panel is coupled to the first panel and defines a lower opening, an upper opening, and an enclosed area. The enclosed area is spatially defined between the first and second panels, above the lower opening and below the upper opening. The third panel is located within the enclosed area between the first and second panels and defines a first chimney between the first panel and the third panel and a second chimney between the second panel and the third panel. The third panel includes a first heatable surface on a surface of the third panel facing the first panel, and a second heatable surface on a surface of the third panel facing the second panel. When the first and second heatable surfaces are activated, thermal energy is created in the respective first and second chimneys for generating the heated air, the heated air flowing by convection substantially upward from the lower opening, through the first and/or second chimneys and out through the upper opening to provide the heated air to the area adjoining the space heater to be heated. The controller is coupled to the first and second heatable surfaces and controls activation and deactivation of the heatable surfaces to control the heated air generated in the first and second chimneys.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with the present invention.

FIG. 1 is a top front right perspective view of a space heater mounted on a wall in accordance with a present embodiment;

FIG. 2 is a top rear left perspective view of a curved outer panel of the space heater of FIG. 1 in accordance with the present embodiment;

Figure 3:
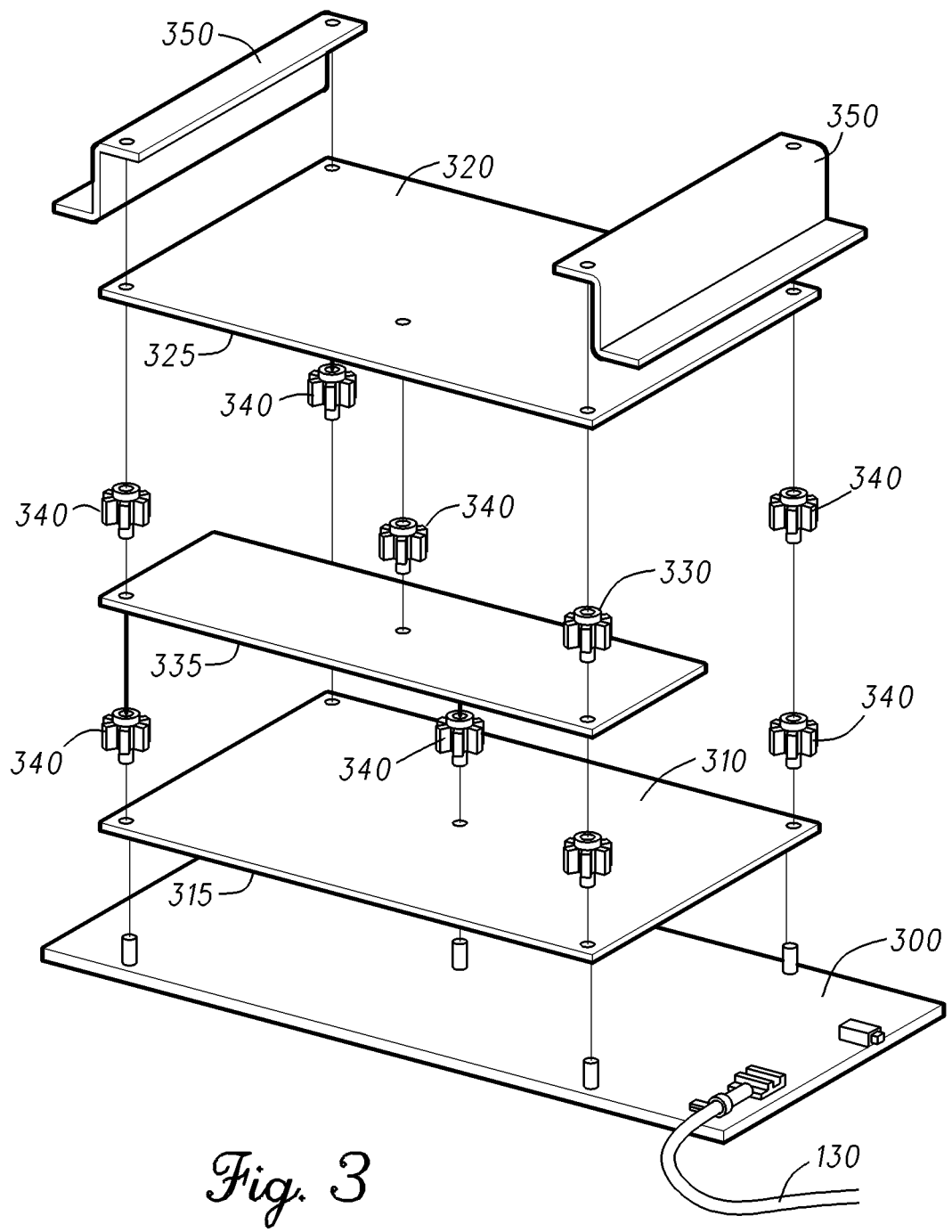
FIG. 3 is an exploded view of the space heater of FIG. 1 in accordance with the present embodiment without the curved outer panel of FIG. 2.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to space heaters and methods for operation of space heaters. Accordingly, the apparatus components have been represented where appropriate by conventional symbols or planar or perspective views in the drawings, showing only those specific details that are pertinent to understanding the embodiments of the present invention so as not to obscure the disclosure with details that will be readily apparent to those of ordinary skill in the art having the benefit of the description herein.

The following detailed description of the invention is merely exemplary in nature and is not intended to limit the invention or the application and uses of the invention. Furthermore, there is no intention to be bound by any theory presented in the preceding background of the invention or the following detailed description of the invention.

Referring to FIG. 1, a top front right perspective view of a space heater 100 in accordance with a present embodiment depicts the space heater 100 mounted on a wall 110 for providing heated air from an upper opening 120 to an area adjoining the space heater 100. The space heater 100 has the ability to provide effective convective heating to heat a room or other living space of a dimension consistent with the design of a typical residential or commercial room.

An electric cord 130 is provided for plugging into a wall socket or otherwise electrically connecting the space heater 100 to an electric power source. While a two-prong plug 133 for connecting the space heater 100 to a 120 volt power source is depicted on the electric cord 130 in FIG. 1, the space heater 100 could also utilize a 220 to 240 volt electric power source. In addition, the space heater 100 could utilize "pig-tail" wires instead of the electric cord 130 in order to be hard-wired into a building's electrical system, thereby not requiring any plug 133, such alternative embodiment also including "pig-tail" wires for connecting to the building's thermostatic control system (e.g., a room thermostat) for control thereby. User input devices, such as a control knob 135 and an ON/OFF switch 136, provide user inputs to a controller of the space heater 100 for control of the heated air produced by the space heater 100. An indicator light 140 is also provided so that a user can readily determine whether electric power is being provided to the space heater 100 (i.e., whether the space heater 100 is turned "ON" or "OFF").

Referring to FIG. 2, a top rear left perspective view of a curved outer cover 200 of the space heater 100 illustrates the outer cover 200 including a substantially flat center portion formed between a left side curved portion 202 and a right side curved portion 204. An enclosed area is defined between the substantially flat center portion of the outer cover 200 and the wall 110 (FIG. 1) to which the space heater 100 is mounted. The depth of this enclosed area is determined by the left side curved portion 202 and the right side curved portion 204 of the outer cover 200. In accordance with the present embodiment the enclosed area is defined to include an air gap of between one-half and two inches for effective generation of convective heat flow.

An exploded view of the space heater 100 in accordance with the present embodiment without the curved outer panel 100 is shown in FIG. 3 and includes a wall mounting base plate 300, a first panel 310 mounted on the base plate 300, an element or third panel 330 including one or more heated surfaces, and a second panel 320. The wall mounting base plate 300 is designed in a conventional mounting bracket/slot arrangement so that a user may attach the space heater 100 to a location on the wall in accordance with the user's wishes. Alternatively, as discussed above, an embodiment of the space heater 100 could be hard-wired directly into the building's electrical system and permanently mounted the wall 110. For space heaters 100 which are permanently mounted to the wall 110, the mounting base plate 300 and any screws or other mounting hardware is designed so that the space heater 100 is not easily removed from the wall 110 (i.e., screws are used to mount the mounting base plate 300 to the wall so that a tool is required to remove the space heater 100 from the wall 110).

The first and second panels 310, 320 are rectangular in shape with similar dimensions. In accordance with the present embodiment, the dimensions of the first and second panels 310, 320 are approximately twenty inches tall by fifteen inches wide. Orientation of the larger dimension in the height direction advantageously provides higher velocity and temperature gradient of heated air convectively flowing from the space heater. The third panel 330 is also rectangular in shape and has a bottom edge 335 located within the space heater 100 approximately colinear with the bottom edges 315, 325 of the first and second panels 31, 320. A width of the third panel 330 is substantially equal to the width of the first and second panels 310, 320. A height of the third panel 330, however, is less than the height of the first and second panels 310, 320. In accordance with the present embodiment, the height of the third panel 330 is approximately half the height of the first and second panels 310, 320.

The first and second panels 310, 320 are separated from the third panel 330 by panel standoff spacers 340. Side panels 350 are provided on the right and left of the first, second and third panels 310, 320, 330 to couple the first and second panels 310, 320 together and to further define the enclosed area of the space heater 100. In addition, the bottom edges 315, 325 of the first and second panels 310, 320, along with bottom edges of the side panels 350 define a lower opening to the enclosed area, an upper opening to the enclosed area (i.e., the upper opening 120 is seen in FIG. 1) being defined by the first and second panels 310, 320 and the side panels 350.

In this manner, dual chimneys are spatially defined within a first portion of the enclosed area between the first panel 310 and the second panel 320 and having a height equivalent to the height of the third panel 330. A first chimney is defined in the first portion of the enclosed area between the first panel 310 and the third panel 330 and above the lower opening, while similarly, a second chimney is formed in the first portion of the enclosed area between the second panel 320 and the third panel 330 and above the lower opening. A second portion of the enclosed area is located above the first portion and encompasses that portion of the enclosed area above the third panel 330.

While the first and second panels 310, 320 are shown as flat panels and the outer panel 200 (FIG. 2) is shown as a curved panel, the first panel 310 could alternatively comprise a curved panel to directly connect to the second panel 320 without the side panels 350 to define the enclosed area.

The third panel 330 is an electrical element which includes a first heatable surface located on a first side of the third panel 330 facing the first panel 310. A second heatable surface is located on a second side of the third panel 330, the second side of the third panel 330 being opposite to the first side and facing the second panel 320. The first and second heatable surfaces may include or be constructed of wire wrap elements, graphite foil elements or other suitable material(s) to effectively convert electrical power provided thereto to thermal energy. Constructing the heatable surfaces from wire wrap elements or graphite foil provides the additional advantages of exceptionally long life of the heatable surfaces and very even heating across the entire heatable surfaces of the third panel 330.

Activation of the first and second heated surfaces by providing electrical power to the heated surfaces of the third panel 330 creates thermal energy in the dual chimneys to generate heated air therein. As the heatable surfaces increase the air temperature within the dual chimneys, the heated air rises up and out of the first portion of the enclosed area. The heated air from the dual chimneys is then combined in the second portion of the enclosed area and, from there, rises up and out of the space heater 100. Therefore, cool air is drawn in through the lower opening from below the space heater 100 and heated air flows out from the upper opening 120 into the air adjoining the space heater 100. In a brief amount of time, a steady airflow is established by a pure convection flow of heated air to keep the room warm, the steady airflow assisted by mixing the heated air from the dual chimneys in the second portion of the enclosed area. In this manner, the space heater 100 advantageously transfers heated air to the environment by, for all practical purposes, exclusively natural convection flow.

This heat transfer process by pure convection flow has several advantages over conventional space heaters. First, no fan or other moving part is required to force air over the heater surface or element and propel the heated air out into the area to be heated. Fans add complexity and cost to these conventional space heaters and are noisy in operation.

Avoiding the need for a fan in the space heater 100 in accordance with the present embodiment also allows an additional level of safety. Most typical heaters would quickly reach dangerous temperatures should the fan fail and must necessarily rely on thermal cut-off switches to kill power to the heater element or heatable surface in this eventuality. The space heater 100 operates by pure convection flow and does not require a fan to maintain a safe operational temperature. Therefore, the space heater 100 is less likely to encounter circumstances which would cause it to overheat. In addition to obviating this safety consideration, avoiding the need for a fan or other device to move the air insures that the space heater 100 is completely silent in operation within a given room, making the space heater 100 ideal for heating rooms such as bedrooms or hospital rooms in which silent operating equipment is desired.

Another advantage of the space heater 100 is that the dual chimney structure in accordance with the preferred embodiment of the space heater 100 permits the design of features that minimize heating losses outside the space heater 100 by thermal radiation. In accordance with the preferred embodiment, the first panel 310 and the second panel 320 include a layer of thermal insulation to prevent such heating loss. Ideally, the thermal insulating layer is overlayed with a reflective inner side facing the chimney area to increase the insulating ability of the first and second panels 310, 320 by reflecting much of the thermal radiation back into the defined chimney area.

The preferred construction of the second panel 320 including the insulating layer overlayed with a reflective inner side prevents loss of heat through the back of the space heater 100 and into the wall 110 (FIG. 1) to which the space heater 100 is mounted while reflecting the thermal radiation back into the chimney area for additional heating therein. In regards to the first panel 310, this preferred construction increases the heating within the chimney area defined by the first panel 310 and the third panel 330 while greatly reducing or preventing the radiation of thermal energy into the room through the first panel 310 and the front panel 200.

While many space heaters radiate thermal energy from a heating element directly into a room environment by, for example, having heating elements visibly exposed to the outside environment, irradiative heating is far from ideal. A space heater that works primarily by radiation emits a significant portion of its heat as radiation and not as heated air, only heating people and/or objects with a direct line of sight to the heater element. While this may be desired in some cases, primarily where it is impractical or undesirable to heat the entire space around the heater and "spot heat" delivered as radiation is preferred, such irradiative heating means that these space heaters must be plainly visible and placed in open areas. This also means that heat will be distributed very unequally throughout the room or area to be heated because an irradiative heater provides essentially no warmth to areas outside the field of view of the heater, such as around a corner, behind a piece of furniture, even off to either side. Thus, while objects outside the field of view of a space heater having visibly exposed heating elements will receive almost no heated air or thermal radiation, any object within that field of view will receive thermal energy in intensities that are often uncomfortable and/or unsafe. Plastics can be warped or melted entirely, painted surfaces can be damaged, or flammable fabrics (e.g., upholstery or draperies) can catch fire due to the potential exposure to intense heat inherent in such heaters.

The space heater 100 does not emit any significant amount of thermal radiation. The first and second panels 310, 320 being constructed with an insulating layer overlaid with a reflective inner side reflect undesirable thermal radiation towards the third panel 330, increasing the temperature within the chimneys defined therebetween to increase the efficiency of heating the air in the chimney (i.e., increasing the rate at which heat is transferred into the chimney's air). The space heater 100 is safer than conventional space heaters because the only material being heated significantly during the operation of the space heater 100 is the air flowing through the dual chimneys of the space heater 100. The pure convection flow of the heated air through the dual chimneys and out through the upper opening 120 naturally flows through the chimneys at a significant rate. Therefore, the space heater 100 and the heated air provided therefrom stays cool enough (effectively in the range of 120° F. to 180° F. on average) to greatly reduce the possibility of thermal damage to nearby objects.

In addition, a traditional irradiative space heater will "waste" a significant amount of energy heating objects that need not, and often should not, be heated. The space heater 100 in accordance with the preferred embodiment delivers a vast majority of its energy as heated air provided directly into the room to provide comfort to the occupants. Thus, the use of purely convective heating by the space heater 100 in accordance with the present embodiment reduces electrical power necessary to heat air within a room to a desired temperature by both requiring less electrical power to generate the heated air and eliminating the need for a fan or other device to propel the air into the room. Thus, the space heater 100 achieves optimal heating of a typical residential room during normal operation without the surface temperature of the outer side of the first panel 310 or the outer panel 200 exceeding 150° F. while only drawing four hundred to four hundred and fifty watts.

Figure 4A:
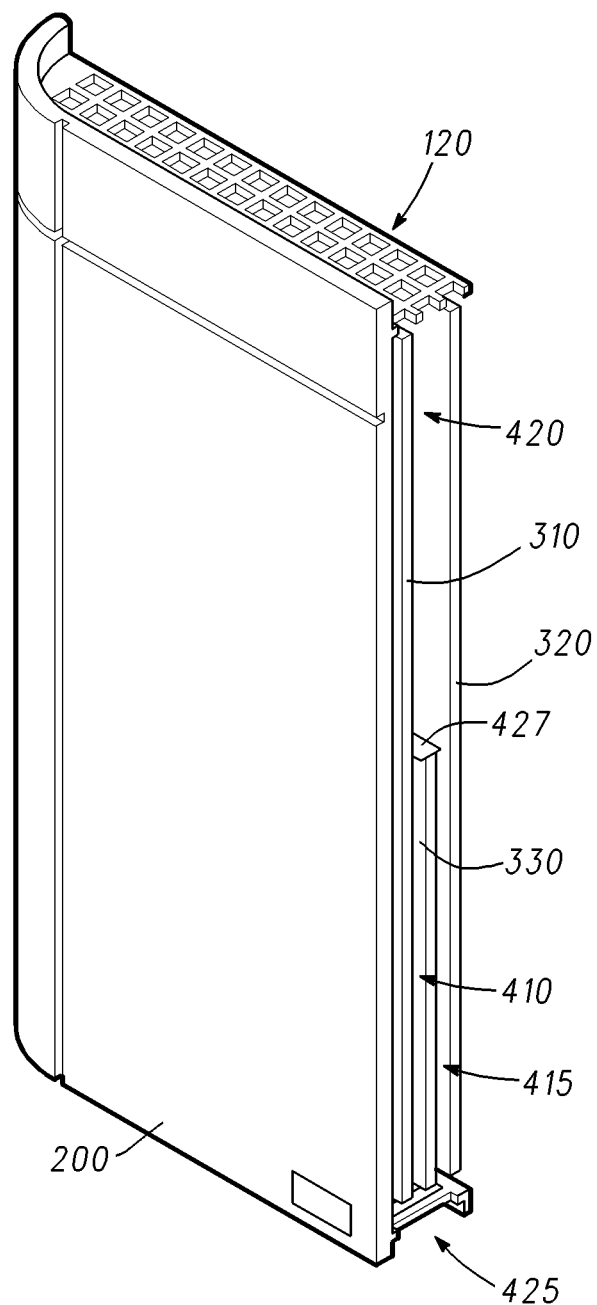
FIG. 4A is a perspective cutaway of the space heater of FIG. 1 in accordance with the present embodiment.

Referring to FIG. 4A, a top front right perspective cutaway of the space heater 100 depicts a cutaway of the outer panel 200 to reveal the first panel 310 and the second panel 320 sandwiching the third panel 330 in the first portion of the enclosed area to form the dual chimneys including a first chimney 410 defined as an air gap between the first panel 310 and the third panel 330 and a second chimney 415 defined as an air gap between the second panel 320 and the third panel 330. A mixing area 420 is defined in the second portion of the enclosed area as an air gap above the first and second chimneys 410, 415 for mixing the air from the first and second chimneys 410, 415 to aid in the convection flow of the heated air upwards through the enclosed area between the first panel 310 and the second panel 320. A metal baffle 427 is provided on an upper edge of the third panel 330 to create a turbulence in air flow from the dual chimneys 410, 415 into the air gap of the mixing area 420, to "encourage" the mixing of the heated air from the dual chimneys 410, 415 with the relatively cooler air of the mixing area 420.

As explained above, operation of the space heater 100 creates a convection flow of air (i.e., a "chimney-effect" in the air gaps of the chimneys 410, 415) when the heated surfaces of the third panel 330 are activated. A first convection flow is established in the first chimney 410, pulling air into a lower opening 425 and heating the air in the chimney 410. Similarly, a second convection flow is established in the second chimney 415, pulling air into the lower opening 425 and heating the air in the chimney 415. In accordance with the preferred embodiment, the air gap between the third panel 330 and the first and second panels 310, 320 to form the first and second chimneys 410, 415 is each between approximately one-fourth inch and one inch, and preferably approximately three-fourths of an inch. The dual flow of convection-heated air is provided from the first and second chimneys 410, 415 to the mixing area 420 formed thereabove in the second portion of the enclosed area to form a combined convection flow, the mixing area 420 providing not only an air gap above the heatable surfaces of the third panel 330 to better facilitate the mixture of the heated air from the dual chimneys 410, 415 with relatively cooler air, but also providing additional buoyant force for drawing the heated air through the space heater 100 by convection flow. In this manner, the heated air flows solely by convection flow through the mixing area 420 and out through the upper opening 120 to an area, such as an adjacent room, adjoining the space heater 100 for heating the area.

Figure 4B:
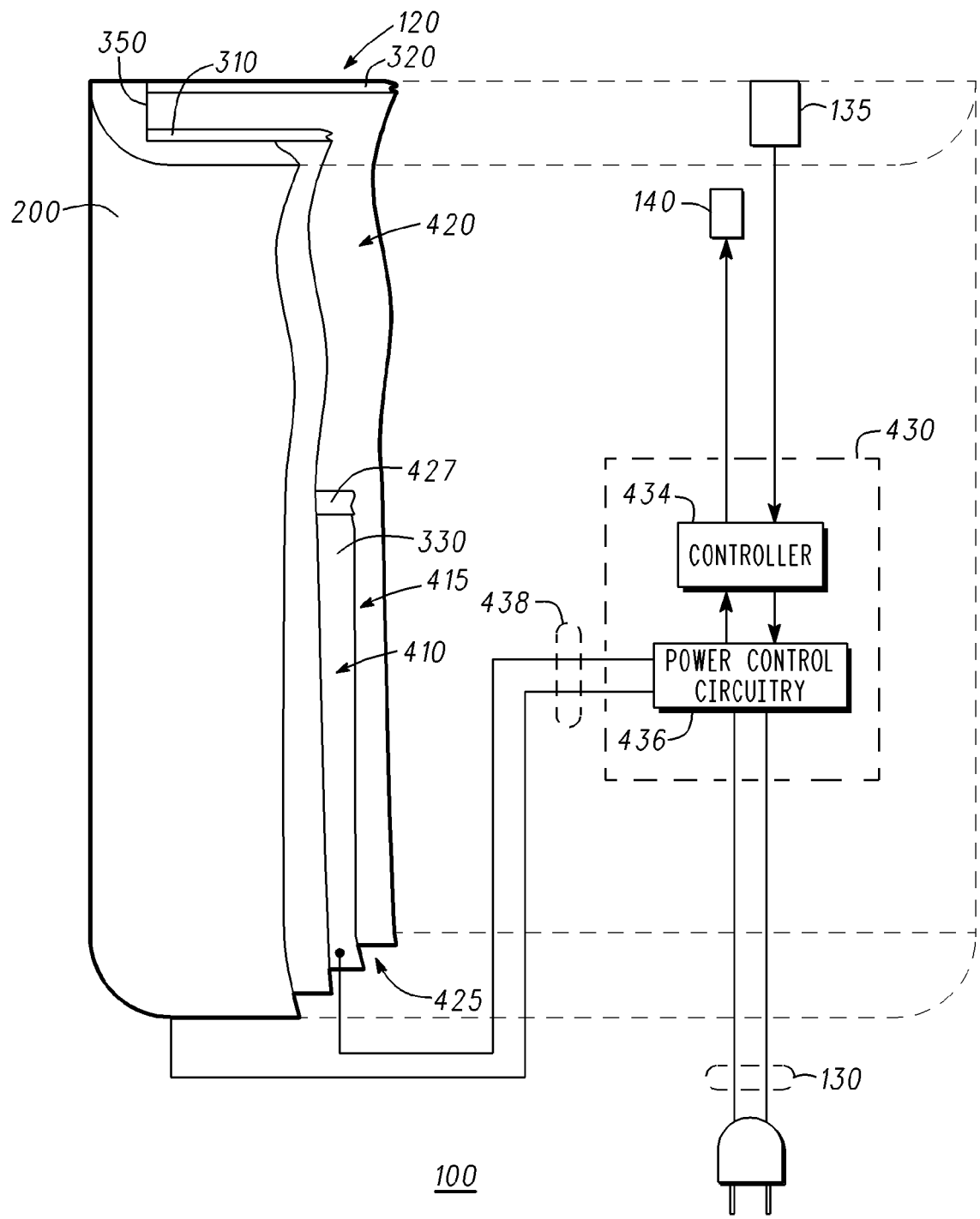
FIG. 4B is a part planar cutaway, part block diagram of the space heater of FIG. 1 in accordance with the present embodiment.

Referring to FIG. 4B, a part planar cutaway, part block diagram of the space heater 100 depicts a cutaway of the outer panel 200 to reveal the first panel 310 and the second panel 320 sandwiching the third panel 330 to form the dual chimneys 410, 415 and the mixing area 420. The space heater 100 includes a solid state control device 430 for controlling the activation and deactivation of the heatable surfaces of the third panel 330. The user input device 135 receives a user input such as turning ON the solid state control device 430 and/or turning a dial of the user input device 135 to set a preferred room temperature. The user input device 135 generates a temperature indicative signal in response to the user input and provides the temperature indicative signal to a controller 434. The power cord 130 is coupled to the heatable surfaces of the third panel 330 through power control circuitry 436 and a cable or line 438. The power control circuitry 436 is coupled to the controller 434 for activation and deactivation of the heatable surfaces to generate the heated air in the chimneys 410, 420. The controller 434 is also coupled to the indicator light 140 for activation thereof when power is supplied to the solid state control device 430.

The controller 434 may be a thermostatic control device including, for example, a triac processor, which receives the temperature indicative control signal from the user input device 135 and not only provides control for the heatable surfaces but also senses the temperature of the heated air to provide temperature dependent control of the space heater 100. Alternatively or in addition thereto, the controller 434 could control the power control circuitry 436 to cycle the activation and deactivation of the heatable surfaces of the third panel 330 for varying the thermal energy generated by the heatable surfaces, thereby varying the heated air in response to the temperature indicative control signal.

In accordance with the preferred embodiment, the solid state control device 430 includes solid-state components and does not incorporate electro-mechanical elements to control the power to the heater. Since the solid state control device 430 neither includes bi-metal thermostats or relays, no audible or distinct "click" is generated when the heatable surfaces are turned ON or OFF. In addition, as the solid state control device 430 includes no electromechanical parts, the heatable surfaces can be rapidly switched ON and OFF.

Figure 5:
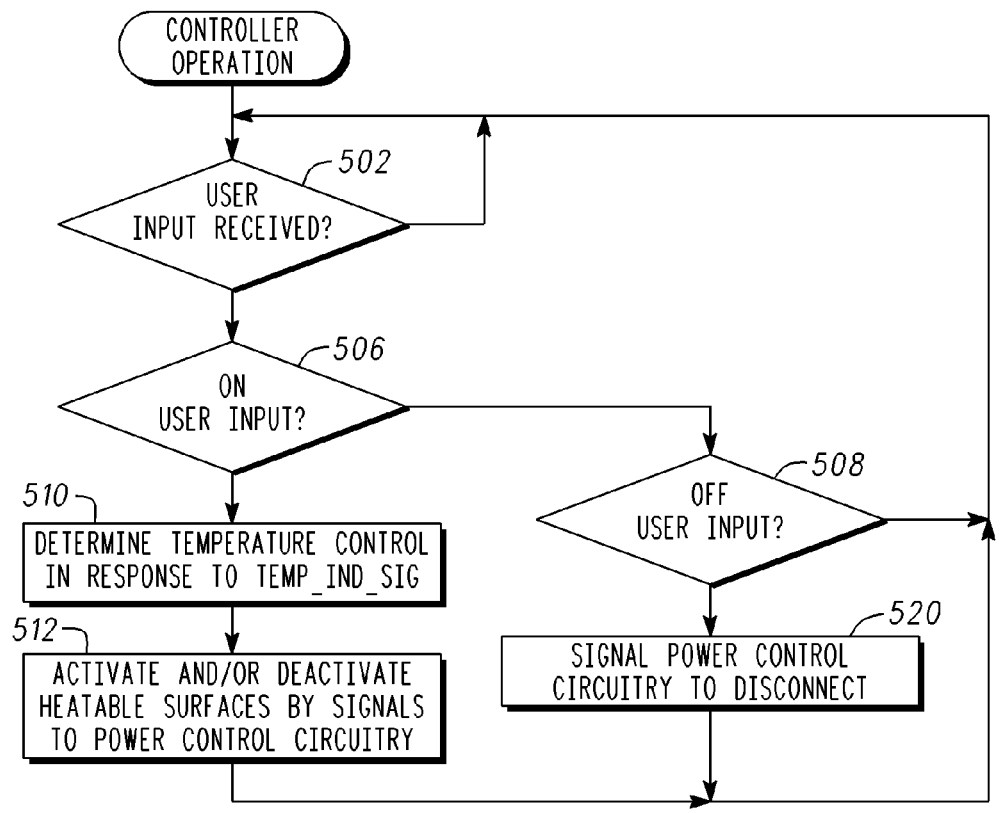
FIG. 5 is a flowchart of an exemplary operation of the space heater of FIG. 1 in accordance with the present embodiment.

FIG. 5 depicts a flowchart 500 of an exemplary operation of the controller 434 of the space heater 100. When a user input is received 502, the controller 434 determines whether the user input 502 indicates to turn ON 506 the space heater 100 or turn OFF 508 the space heater 100.

In response to a user input 502 to turn ON 504 the space heater 100, the controller 434 receives the temperature indicative signal from the user input device 135 and determines the operation indicated by the temperature indication signal 510. The controller 434 then provides appropriate signaling to the power control circuitry 436 to activate and deactivate the heatable surfaces of the third panel 330 in accordance with the temperature indication signal the operation indicated by the temperature indication signal 512. As discussed above, such operation 512 could include thermostatic control of the heatable surfaces or cycling the heatable surfaces. As the temperature indication signal is varied, operation detects this variation 510 and adjusts the signals provided to the power control circuitry 436 to appropriately alter the operation 512 of the heatable surfaces of the third panel 330. In response to the operation 512 of the heatable surfaces, the air is heated in the chimneys 410, 415 (FIG. 4A)

and mixed in the mixing area 420 to generate convection flow of the heated air through the enclosed area of the space heater 100 and out through the upper opening 120 to the area adjoining the space heater 100.

When the user input 502 indicates to turn OFF the space heater 508, the controller 434 signals 520 the power control circuitry 436 to disconnect the power cord 130 from the line 438 to the heatable surfaces of the third panel 330, thereby turning OFF the space heater until a subsequent user input 502 is received indicating to turn ON 506 the space heater 100.

Figure 6:
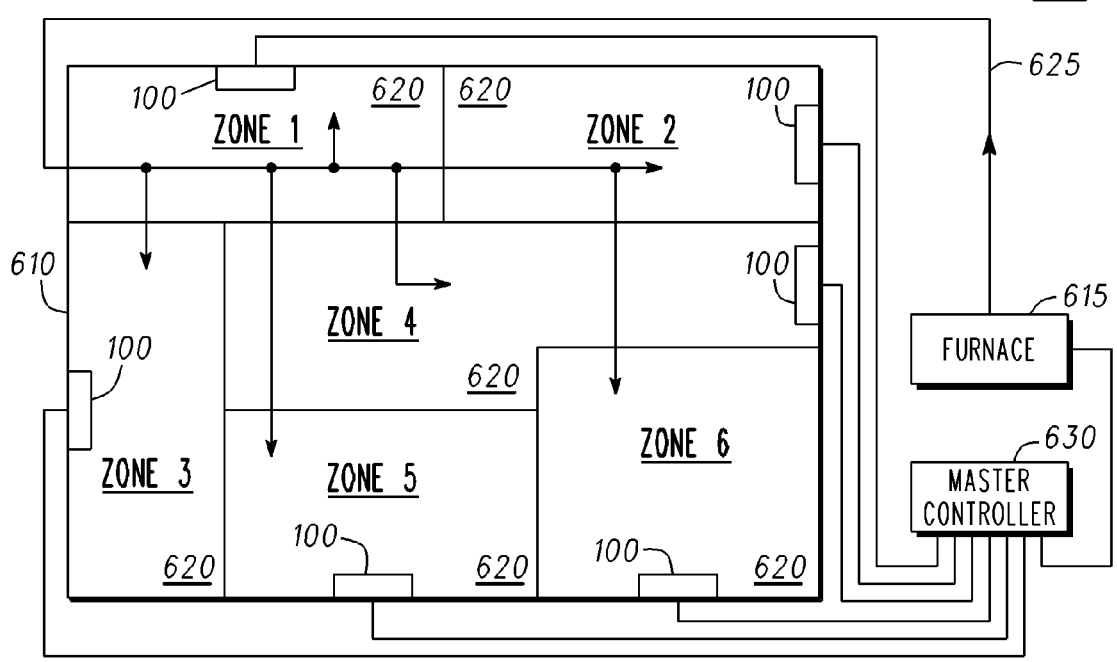
FIG. 6 is a block diagram of a building heating system including the space heater of FIG. 1 in accordance with the present embodiment.

Referring to FIG. 6, a block diagram depicts area heating system 600 for heating a building 610. The heating system 600 could control operation of multiple space heaters 100 as well as a furnace 615. Heating of rooms or zones 620 of the building 610 would be provided by forced air provision of heated air from the furnace 615 through ducts 625 to the zones 620. An area master controller 630 is coupled to the furnace 615 and the multiple space heaters 100 for efficient, energy-saving control of the system 600 in response to an area heating system control algorithm stored in and operated by the master controller 630. Whether the furnace 615 is electric-, gas- or oil-operated, it consumes a large amount of energy to heat the zones 620. For example, much of the heated air does not heat the zones 620 as it is lost between the furnace and the zones when passing through the ducts 625, therefore it is necessary to generate heated air at the furnace 615 at a temperature larger than the temperature desired in the zones 620. In addition, the forced air system requires additional energy to propel the heated air through the ducts 625. The master controller 630 can conserve energy by operating the furnace 615 and the space heaters 100 in accordance with the area heating system control algorithm to reduce operation of the less-efficient furnace 615 by maintaining the zones at desired temperatures through supplementing the heated air provided from the furnace 615 with heated air provided from the energy-efficient space heaters 100. In addition to overall conservation of energy, operation of the system 600 by the master controller 630 in accordance with the area heating system control algorithm can provide different controlled temperatures to the different zones 620 of the system 600.

An exemplary method for operation of the system 600 begins by sensing temperature information in one or more of the zones 620. A signal corresponding to the temperature information of each of the various zone(s) 620 is generated and provided to the master controller 630. The master controller 630 generates a space heater control signal in response to the signal and in accordance with the area heating system control algorithm The space heater control signal is provided to one or more of the space heaters 100 to activate and deactivate the heatable surfaces of the third panels 330 thereof in response to the space heater control signal. In this manner the system can conserve energy by utilizing operation of the energy-efficient space heaters 100 to supplement and/or replace operation of the furnace 615 and its heated air provision mechanism.

Thus it can be seen that a method and apparatus have been disclosed which advantageously provides a space heater for generating heated air and providing the heated air to an area adjoining the space heater in a more even manner, while reducing the undesired noise and thermal radiation provided to such area. While at least one exemplary embodiment has been presented in the foregoing detailed description of the invention, it should be appreciated that a vast number of variations exist, including a vast number of acceptable dimensions. In addition, in this document, relational terms such as first and second, top and bottom, and the like are used solely to distinguish one entity or action from another entity or action without necessarily requiring or implying any actual such relationship or order between such entities or actions. The terms "includes", "including", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "includes . . . a" does not, without more constraints, preclude the existence of additional identical elements in the process, method, article, or apparatus that comprises the element.

It should further be appreciated that the exemplary embodiment or exemplary embodiments are only examples, and are not intended to limit the scope, applicability, dimensions, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A space heater for generating heated air and providing the heated air to an area adjoining the space heater, the space heater comprising:
   a first panel;
   a second panel coupled to the first panel and defining an enclosed area there between and having a first height from an air inlet to an air outlet; and
   an element having one or more heatable surfaces located within a first lower portion of the enclosed area and having a second height less than the first height to define at least a first and second chimney each having a respective heatable surface therein and a mixing chimney above the first and second chimneys within a second portion of the enclosed area and, when activated, the one or more heatable surfaces create thermal energy for generating the heated air within one or more of the first and second chimneys within the enclosed area, the heated air flowing by convection substantially upwardly from the air inlet through the one or more first and second chimneys to provide the heated air to the mixing chimney and outwardly through the air outlet to the area adjoining the space heater.

2. The space heater in accordance with claim 1 wherein at least one of the first and second panels comprises curved side panels such that the first panel connects to the second panel to define the enclosed area.

3. The space heater in accordance with claim 1 wherein at least one of the first panel and the second panel includes a reflective inner side, the at least one of the first and second panels being oriented such that the reflective inner side faces one of the one or more chimneys for reflecting thermal radiation there into, the at least one of the first and second panels being insulated to prevent substantially all of the thermal radiation from radiating there-through.

4. The space heater in accordance with claim 1 wherein both the first and second panels include reflective inner sides, the first and second panels being oriented such that each of the reflective inner sides face one of the one or more chimneys for reflecting thermal radiation back into the one or more chimneys, the first and second panels preventing substantially all of the thermal radiation from radiating there-through.

5. The space heater in accordance with claim 1 wherein the element has a bottom edge located within the space heater approximately colinear with a bottom edge of the first and second panels.

6. The space heater in accordance with claim 1 wherein the one or more heatable surfaces of the element comprise a heater element selected from the group of heater elements consisting of at least one wire wrap element and at least one graphite foil element.

7. The space heater in accordance with claim 1 further comprising a solid state controller for controlling activation and deactivation of the one or more heatable surfaces of the element.

8. The space heater in accordance with claim 7 wherein the solid state controller includes a thermostatic control device and provides temperature dependent control for activating and deactivating the one or more heatable surfaces of the element in response to the thermostatic control device.

9. The space heater in accordance with claim 7 wherein the solid state controller cycles activation and deactivation of the one or more heatable surfaces of the element to vary the thermal energy created by the one or more heatable surfaces of the element.

10. A dual chimney space heater for generating heated air and providing the heated air to an area adjoining the space heater to be heated, the space heater comprising:
 a first panel;
 a second panel coupled to the first panel to define an enclosed area having a lower opening and an upper opening, the enclosed area spatially defined between the first and second panels and above the lower opening and below the upper opening;
 a third panel located within a lower portion of the enclosed area between the first and second panels to define:
  a first chimney between the first panel and the third panel and,
  a second chimney between the second panel and the third panel;
 a mixing chimney defined between the first panel and the second panel in an upper portion of the enclosed area,
  a first heatable surface on a surface of the third panel facing the first panel and a second heatable surface on a surface of the third panel facing the second panel, and wherein, when the first and second heatable surfaces are activated, thermal energy is created in the respective first and second chimneys for generating the heated air, the heated air flowing by convection substantially upwardly from the lower opening, through the first and/or second chimneys into and through the mixing chimney and out through the upper opening to provide the heated air to the area adjoining the space heater to be heated; and
 a controller coupled to the first and second heatable surfaces for controlling activation and deactivation thereof to control the heated air generated in the first and second chimneys.

11. The dual chimney space heater in accordance with claim 10 wherein the first heatable surface and the second heatable surface each comprise a heater element selected from the group of heater elements consisting of wire wrap elements and graphite foil elements.

12. The dual chimney space heater in accordance with claim 10 wherein the controller comprises:
 a user input device for receiving a user input and generating a temperature indicative control signal in response thereto; and
 a thermostatic control device coupled to the user input device for providing temperature dependent control by the activation and the deactivation of the first and second heatable surfaces in response to the temperature indicative control signal.

13. The dual chimney space heater in accordance with claim 10 wherein the controller comprises a user input device for receiving a user input and generating a temperature indicative control signal in response thereto, wherein the controller cycles the activation and the deactivation of the first and second heatable surfaces to vary the heated air generated by the first and second heatable surfaces in response to the temperature indicative control signal.

14. The dual chimney space heater in accordance with claim 10 wherein the enclosed area has a first height, and wherein the third panel has a second height less than the first height.

15. A method for generating a convection flow of air through an enclosed area defined by a first panel and a second panel of a space heater, the method comprising the steps of heating air by activating a respective heatable surface within two or more chimneys defined by an intermediate panel disposed between the first panel and the second panel within a lower portion of the enclosed area generating a convection flow of air substantially upwardly from a lower opening into the enclosed area, through the two or more chimneys and out to a mixing chimney defined in an upper portion of the enclosed area between the first panel and the second panel; mixing the heated air therein; and flowing air through an upper opening out of the enclosed area to provide heated air to an area adjoining the space heater.

16. The method in accordance with claim 15 wherein the step of heating air comprises the step of heating air by activating the heatable surface within the two or more chimneys and by reflecting thermal radiation generated by the heatable surface back into the two or more chimneys from a reflective inner surface of at least one of the first and second panels.

17. The method in accordance with claim 15 wherein the space heater is one of a plurality of space heaters included with an area heating system and wherein the area adjoining the space heater is one of a plurality of zones of the area heated by the area heating system, the area heating system also including an area controller, the method further comprising the steps of:
 sensing temperature information of the one of the plurality of zones;
 generating a signal corresponding to the temperature information of the one of the plurality of zones;
 providing the signal to the area controller;
 generating a space heater control signal in response to an area heating system control algorithm and the signal; and
 providing the space heater control signal to the space heater,
 wherein the step of heating air comprises the step of activating and deactivating selectively the heatable surface within the one or more chimneys of the one of the plurality of space heaters in response to the space heater control signal for supplemental heating of an area and the use of the signal from the space heater for selectively operating the area heating system for area heating.

18. The method of heating an area having a plurality of rooms serviced for heating by an area heating system furnace and a plurality of space-heaters, wherein room proximate a respective one of the space heaters is one of a plurality of zones heated by the area heating system furnace, the area heating system also including an area controller, the method further comprising the steps of:
- sensing temperature information of the one of the plurality of zones;
- generating a signal corresponding to the temperature information of the one of the plurality of zones;
- providing the signal to the area controller;
- generating a space heater control signal and an area heating system furnace control signal in response to an area heating system control algorithm and the signal; and
- providing the space heater control signal to the space heater and the area heating system furnace control signal,
- wherein the rooms are serviced for heating air by selective activating and deactivating the one of the plurality of space heaters and the area heating system furnace in response to the space heater control signal and the area heating system furnace control signal for supplemental heating of the one of the zones by the one of the space heaters and area heating by the area heating system furnace.

* * * * *